(12) United States Patent
Ashworth

(10) Patent No.: US 6,339,953 B1
(45) Date of Patent: Jan. 22, 2002

(54) PIPE LEAKAGE DETECTION

(75) Inventor: Roger Philip Ashworth, Leics (GB)

(73) Assignee: Transco PLC, London (GB)

( * ) Notice: Subject to any disclaimer, the term of this patent is extended or adjusted under 35 U.S.C. 154(b) by 0 days.

(21) Appl. No.: 09/424,987

(22) PCT Filed: Jun. 3, 1998

(86) PCT No.: PCT/GB98/01468

§ 371 Date: Feb. 15, 2000

§ 102(e) Date: Feb. 15, 2000

(87) PCT Pub. No.: WO98/55846

PCT Pub. Date: Dec. 10, 1998

(30) Foreign Application Priority Data

Jun. 4, 1997 (GB) .............................................. 9711432

(51) Int. Cl.[7] .......................... G01M 3/04; G01M 3/08; G01M 3/28; F16K 21/00; G01F 15/00
(52) U.S. Cl. ...................................... 73/49.5; 73/40.5 R
(58) Field of Search ........................... 73/49.5, 40.5 R, 73/40

(56) References Cited

U.S. PATENT DOCUMENTS

| | | | | |
|---|---|---|---|---|
| 3,162,505 A | * | 12/1964 | Hall ............................ 346/33 |
| 3,889,522 A | * | 6/1975 | Mayo ....................... 73/40.5 R |
| 4,608,857 A | * | 9/1986 | Mertens et al. ........... 73/40.5 R |
| 4,727,748 A | * | 3/1988 | Horigome et al. .............. 73/40 |
| 4,808,925 A | * | 2/1989 | Baird ........................... 324/221 |
| 4,872,336 A | * | 10/1989 | Baillie ...................... 73/40.5 R |
| 5,046,519 A | * | 9/1991 | Stenstrom et al. ............... 137/1 |
| 5,272,646 A | * | 12/1993 | Farmer ......................... 364/509 |
| 5,408,420 A | * | 4/1995 | Slocum et al. .............. 364/558 |
| 5,467,640 A | * | 11/1995 | Salinas ..................... 73/40.5 R |
| 5,501,115 A | * | 3/1996 | Kamiyama et al. ......... 73/865.8 |
| 5,526,679 A | * | 6/1996 | Filippi et al. ............. 73/40.5 R |
| 5,720,345 A | * | 2/1998 | Price et al. ............... 166/254.2 |

* cited by examiner

Primary Examiner—Hezron Williams
Assistant Examiner—David J. Wiggins
(74) Attorney, Agent, or Firm—Oblon, Spivak, McClelland, Maier & Neustadt, P.C.

(57) ABSTRACT

A device and a method for pipeline leakage detection. A pipeline leak detector travels through the bore of a pipeline, applies a test pressure to a fluid contained within the pipeline, and measures the resultant rate of change of pressure in the pipeline by using back extrapolation of the test data to determine an initial pressure drop rate. The degree of leakage at a given position in the pipeline is then determined from the rate of change of pressure in the pipeline.

23 Claims, 3 Drawing Sheets

PIPE LEAKAGE DETECTION

The invention relates to pipe leakage detection for use in fluid pipelines (e.g. natural gas).

BACKGROUND OF THE INVENTION

1. Field of the Invention

There is a need to test pipelines for leakage and to preferably be able to do so whilst the fluid is actually flowing through the duct, so as to avoid interrupting the downstream supply or services.

2. Discussion of the Background

The present invention is concerned with providing a mechanism for testing leakage such as that which may occur in pipe joints.

SUMMARY OF THE INVENTION

According to the invention there is provided a pipeline leak detector comprising means for travelling through the bore of the pipeline; means for applying a test pressure to the pipeline; means for measuring the resultant rate of change of pressure; and means for determining the degree of leakage at a given position within the pipeline from the rate of change measurement.

Further according to the invention there is provided a method of detecting leakage in a pipeline comprising moving a device through a pipeline to a desired location; applying a test pressure to the pipeline, measuring the resultant rate of change of pressure and determining the degree of leakage at that location from the rate of change measurement.

BRIEF DESCRIPTION OF THE DRAWINGS

The invention will now be described by way of example with reference to the accompanying drawings in which.

DESCRIPTION OF THE PREFERRED EMBODIMENTS

Figure 1:
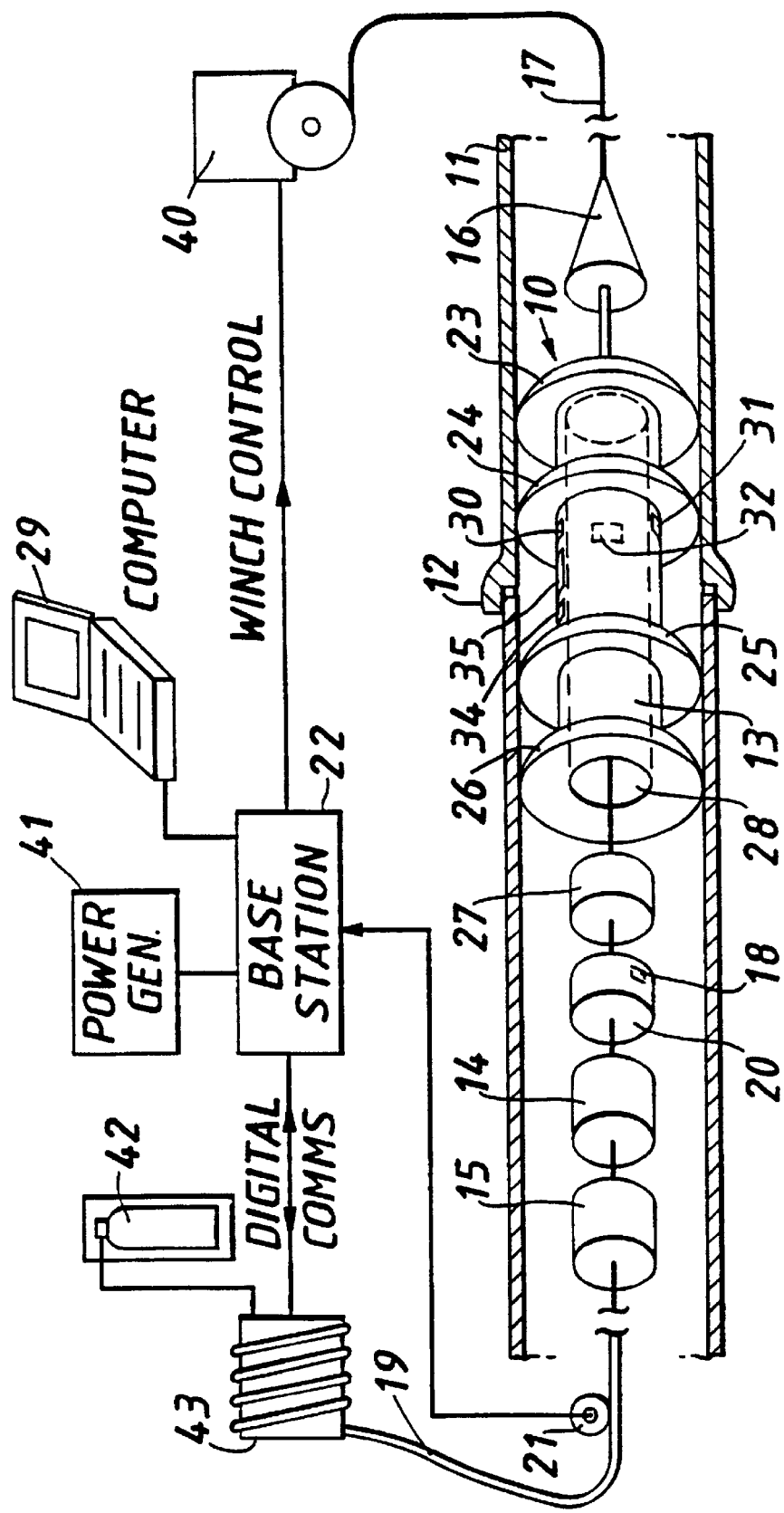
FIG. 1 shows an embodiment of the leak detecting pig.

The leak testing pig train 10 of FIG. 1 is shown within an existing pipeline 11 which incorporates a joint 12 where two sections abut. The pig train 10 includes a leak pig 13 with a flexible central body portion (e.g. of flexible plastics material) capable of 1D bend passing and connected to a valve and sensor module 27, regulator module 20 for regulating the test gas, an electronic control module 14 and umbilical termination and power regulator module 15, the latter being linked via a trailing umbilical cable 19 to a base station 22.

The base station connects to a computer 29 (e.g. a laptop pc). The control module 20 includes a gas regulator valve 18 which receives gas for test purposes via the umbilical 19. The umbilical also provides power to the pig as well as control and data lines (digital). The pig is towed through the pipeline 11 via tow cone 16 by means of towline 17 attached to a winch 40. The umbilical cable 19 will be fed over an encoder wheel 21 to indicate distance travelled, this information being passed to the computer 29 via basestation 22. The pig is automatically winched under computer control through the gas main pipeline 11 in a stepwise manner to perform pressure decay tests at each step. The system can be configured to provide some overlap at each step to ensure full checking of the pipeline.

A portable power generator 41 provides power for the pig, the computer 29 and basestation 22. A gas bottle 42 (e.g. natural gas) provides the test gas for pressure tests to the pig via umbilical 19 which passes over drum 43.

The pig includes four circumferential seals 23–26 to provide an annular test volume in the region between seals 23 and 26. The test volume is between two annular seal volumes bounded by seals 24 and 25. The gas supply is allowed to pass through the pipe for use, by the presence of a hollow central tube portion 28. The flexible body portion between seals 24 and 25 allows relatively tight bends during insertion and travel to be accommodated as do the control and regulation requirements into a number of separate modules to allow 8 inch pipe testing.

The pig includes three sensors 30–32 which are spaced circumferentially around the pig to detect the location of the pipe joint 12 as the pig travels through the pipeline. These sensors can each comprise a small magnetic source with associated magnetic sensor (e.g. Hall effect).

The modules include microprocessors to provide a data link to and from the computer 20 via cable 19 and the on-board electronics will receive sensor information as well as control the pig operation. A battery provides the power source or an alternative source.

In order to carry out the leakage test operation an equalisation valve 35 is provided which, when open, under electronic control allows test and seal volume pressures to be balanced. A precision differential pressure sensor system 34 is provided to determine pressure drops during decay tests. The sensor for illustrative purposes is shown on pig 13, but in practice it will typically reside within the appropriate module 27 and be linked to the pig 13 by small pipes to allow sensing to be achieved at the inner and outer volumes described below.

Figure 2:
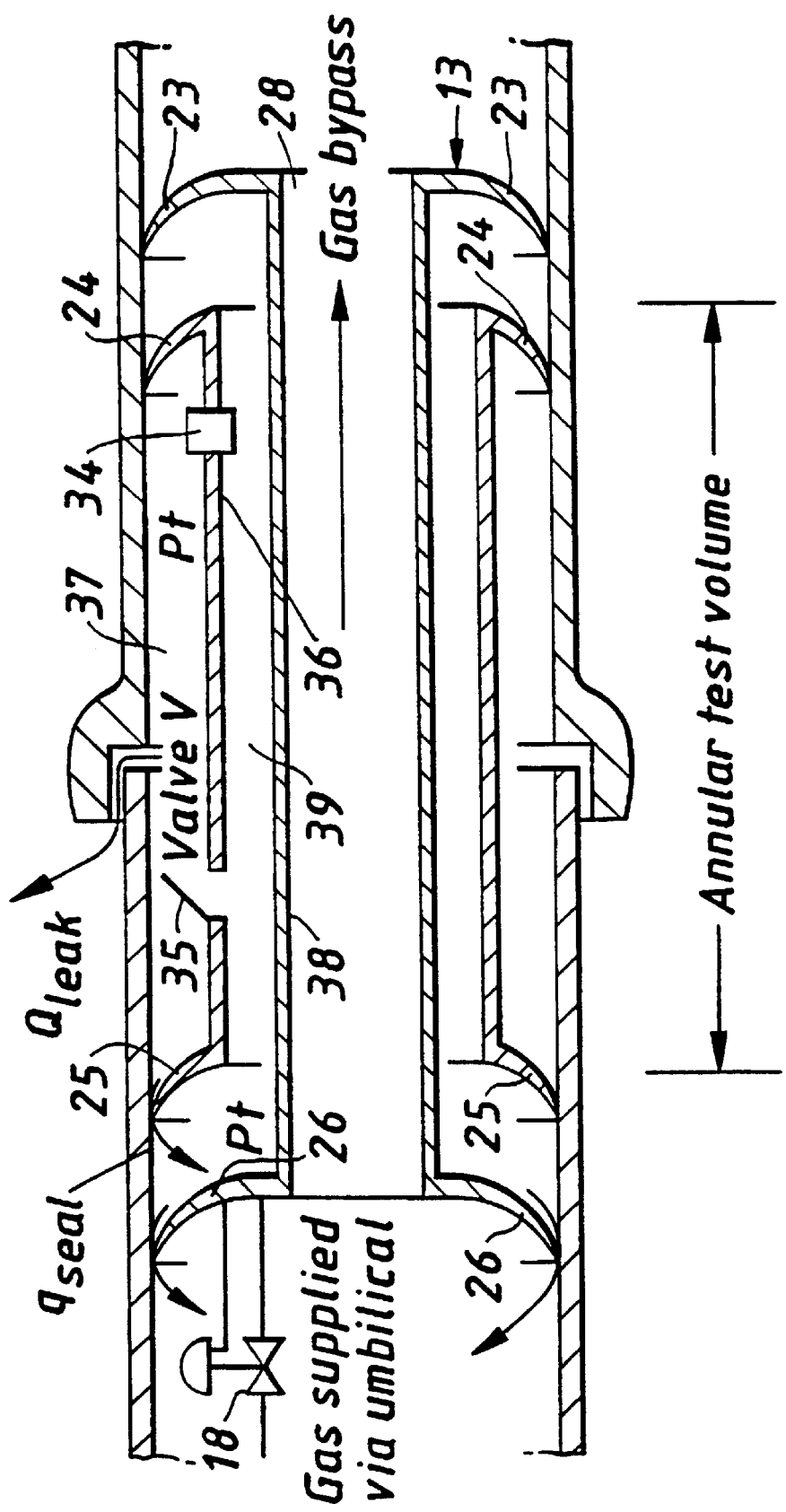
FIG. 2 shows a schematic view of the leak detecting pig within an existing pipeline.

The mechanism associated with the leak tests is illustrated in the schematic of FIG. 2. The schematic drawing shows the pig 13 within pipeline 11 and a leak being present in joint 12 (the leak being exaggerated for illustrative purposes). The seals 24 and 25 together with the outer wall of cylindrical pig portion 36 and the pipe wall form a first chamber 37 (when equalisation valve 35 is closed). The seals 23 and 26 together with the inner wall of cylindrical pig portion 36 and the wall of the inner cylindrical pig portion 38 form a second chamber 39. Test gas will leak through the joint leak (Q leak). There may also be leakage (q seal) of the test gas between the chambers as these may not form a perfect seal with the pipe. However, this is dealt with in the computations.

The test volume is within chamber 37 and the seal volume is within chamber 39 and with the valve 35 open their pressures are balanced. For a perfect gas, $$\frac{dp}{dt} \propto \frac{Q}{V}$$

where Q is the flow out of volume V of chamber 37.

Using a test pressure, leakage can be detected and in practice the degree of leakage can be measured as well.

A pressure decay test is performed by closing the equalisation valve and monitoring test pressure using the high resolution pressure transducer system 34. In practice, the main valve on closure can cause disturbances downstream. In order to produce a more stable reference, a small volume reference chamber is provided with its own regulation valve in series to keep a stable reference value just during the main valve sequence.

Pressure decay due to a leak from the test volume will be reduced by leakage past the inner seals 24, 25, from seal to test volume. However, at the instant the equalisation valve 35 is closed, there is zero differential pressure across the inner seals and therefore no leakage past them. Using back extrapolation of test data, it is possible to determine the initial pressure drop rate dp/dt at the instant the equalisation valve is closed, and since the test volume is known, leakage Q can be calculated.

We have determined that even though there may be leakage into the pipeline from seals 23 and 26 as well and between chambers 37 and 39 due to seals 24 and 25, it is the slope of the leakage curve that is related to the joint leakage.

Figure 3:
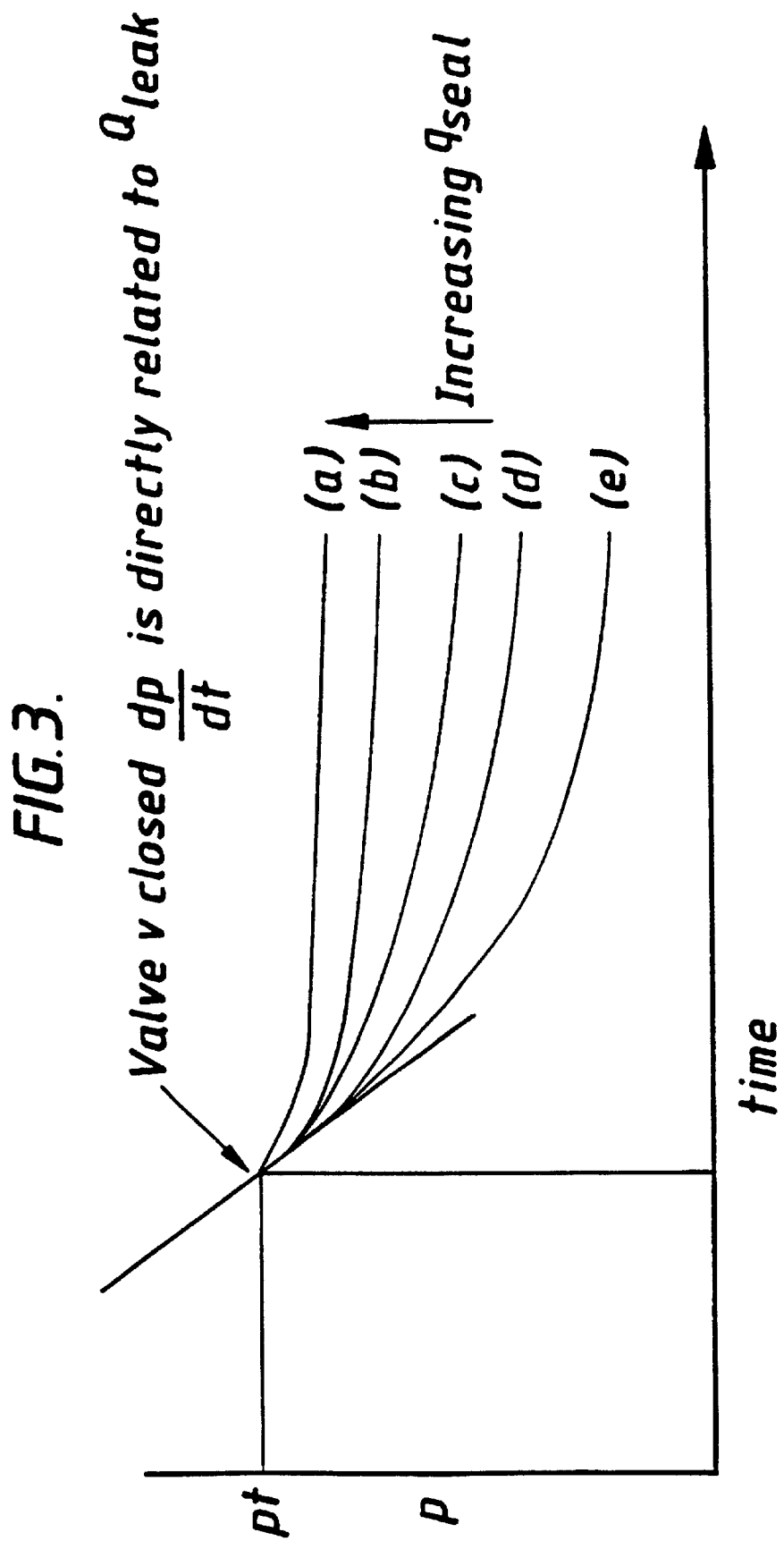
FIG. 3 shows a graph associated with the testing configuration.

Hence from FIG. 3 different graphs are shown for a given joint leak (Q leak) for various leakage patterns for the seal between chambers (q seal). Thus graph (e) shows the most effective seal and graph (a) the least effective. Using calculus to determine the slope, $$\frac{dp}{dt}$$

is directly related to Q leak. The inner seal leakage is zero the instant the equalisation valve is shut.

By using a relatively small chamber 37, the small test volume will give large drop rates for Q leak so detecting small leaks. Hence the pig will be winched, in steps, under computer control. At each step, winching is paused to allow the test to be effected. Leakage can occur at hot spots or joints for example. Where leakage is at a joint, the presence of detectors 30–32 (of FIG. 1) will identify the source of leakage.

If a major leak is detected along the pipe at any location, this can cause an alarm or other indication in the P.C. as detected by being unable to balance pressures in the test and seal volumes.

Typically leakage measurement is from 0.0028 SCMH (0.1 SCFH) to 1.0 SCMH (35 SCFH) in a low pressure main. Leakage measurement results can be within 10% accuracy or better.

Inner Seal Integity Test

In the event that the pig stops with an inner seal resting over an intrusion or debris, leakage past the inner seal may be such that test and seal volume pressures remain equalised when the equalisation valve is closed. This would mask any leakage from the test volume, if further testing does not occur. However, if the inner seals are functioning correctly, a forced increase in test volume pressure (e.g. by changing the preset regulation pressure) with the equalisation valve closed would give an increase in differential pressure across the inner seals. By monitoring this effect, seal integrity can be checked at each test step along the pipe. Alternatively, venting of the test volume via another valve to the actual pipeline pressure to achieve a pressure drop will also serve as a mechanism for checking seal integrity Service Location If services are taken from the pipeline, it will be necessary to discriminate between joint leaks and pressure drops due to consumption at service pipe locations. Service pipe junctions could be detected by a magnetic source present in the service pipe, for example.

Leakage from services can be measured, if the service is blanked off in the property. In this case, an additional deliberate leak at the property end of the service will be used for service volume quantification. If service leakage measurements are not required, the flow through facility on the pig ensures continuity of gas supply. In this case, leakage measurements while the pig is parked over the service would be masked by the demand from the property and would be discarded.

The computer provides a user interface for entry of site details, a running graphical display of leakage versus distance along the main, and software to drive the test sequence and winch control systems.

Post inspection data analysis will allow on site graphical or report style presentation of inspection results, showing the position and magnitude of leaks above a user set threshold, together with the positions of joints and services.

Inspection time will typically be 20–30 minutes per 100 meters of main. Hence the pig is designed for use in live gas mains typically without interruption to downstream gas supply or services. It incorporates joint and service position detection and will determine the position and magnitude of leakage from mains and services.

The leakage pig is unique as it will both locate and accurately measure gas leakage from distribution pipes, dead or live. The source of leakage could be a faulty joint or a pipe defect.

The pig is therefore able to:

1. accurately quantify leakage both for inspection purposes and for collection of valuable leakage data,
2. test integrity of any in pipe repair; and
3. locate leaks where barholing and external repair is precluded.

The device has been described in terms of carrying out checks whilst it is temporarily stationary over any particular pipe position and utlising the equalisation valve, before the device moves forward again to the next incremented step position.

However in a further arrangement the valve could be replaced by an equalisation aperture and the device could move continuously through the pipeline to carry out its tests.

This freeflow detection would be particularly suitable for testing small leaks (e.g. of the order of 100 scmh) in a transmission pipeline system, by employing both local pressure drop measurements and pipe bore mapping.

What is claimed is:

1. A pipeline leak detector for conducting a leakage test sequence comprising:

means for travelling through the bore of the pipeline;

means for applying a test pressure to a fluid contained within the pipeline;

means for measuring the resultant rate of change of pressure by using back extrapolation of test data to determine the initial pressure drop rate; and means for determining the degree of leakage at a given position within the pipeline from the rate of change measurement.

2. A detector as claimed in claim 1 including means for computing the instantaneous rate of change of pressure (dp/dt) following the application of the test pressure.

3. A detector as claimed in claim 2 including differential pressure sensing means for determining the pressure difference between an applied pressure in a first chamber within the detector and a second chamber adjacent the first chamber, said second chamber forming a test chamber for leak detection to allow the rate of change of pressure to be determined therefrom.

4. A detector as claimed in claim 3 including aperture means between the first and second chambers to allow equalisation of pressure to be provided prior to the leak measurement.

5. A detector as claimed in claim 4 wherein the aperture means includes a valve for controlling when the aperture is open.

6. A detector as claimed in claim 1 including means for incrementing the travel along the pipeline and means for testing for leakage at that location.

7. A detector as claimed in claim 6 wherein the incrementing means is configured to cause the tests to be effected in overlapping steps.

8. A detector as claimed in claim 1 including means for discriminating between joints and the remainder of the pipeline.

9. A detector as claimed in claim 8 wherein the discriminating means includes a magnetic sensing configuration.

10. A detector as claimed in claim 1 including umbilical means for providing a test pressure from a remote source.

11. A detector as claimed in claim 10 wherein the umbilical means includes an electrical cable.

12. A detector as claimed in claim 1 wherein the means for travelling through the pipe includes an elongate body portion of flexible material.

13. A detector as claimed in claim 1 wherein the means for applying a test pressure include a first chamber formed between the pipeline wall and the detector and a second chamber coaxial with the first chamber, and means are provided to apply a fluid test pressure to the chambers from a source separate to any fluid flowing in the pipeline.

14. A detector as claimed in claim 13 including means for providing an aperture between the first and second chambers to allow a pressure equalisation to be obtained.

15. A detector as claimed in claim 14 wherein the aperture is configured to close as part of the test sequence.

16. A detector as claimed in claim 1 including means for determining the distance travelled by the detector within the pipeline to assist in location of the position of a leak within the length of the pipeline.

17. A detector as claimed in claim 1 including means for detecting a pipe junction within the main pipe.

18. A method of detecting leakage in a pipeline comprising:

moving a device through a pipeline to a desired location;

applying a test pressure to a fluid contained within the pipeline;

measuring the resultant rate of change of pressure by using back extrapolation of test data to determine the initial pressure drop rate; and determining the degree of leakage at that location form the rate of change of pressure.

19. A method as claimed in claim 18 including the step of computing the instantaneous rate of change of pressure (dp/dt) following the application of the test pressure.

20. A method as claimed in claim 19 including the step of determining the pressure difference between an applied pressure in a first chamber and a second chamber forming a test chamber for leak detection to allow the rate of change of pressure to be determined therefrom.

21. A method as claimed in claim 20 including the step of equalising the pressure in the first and second chambers prior to the measurement step.

22. A method as claimed in claim 18 including the step of detecting a joint within the pipeline as the device moves therethrough.

23. A method as claimed in claim 18 including the step of discriminating between pipe junctions and pipe joints.

* * * * *